United States Patent Office 3,545,963
Patented Dec. 8, 1970

3,545,963
METHOD OF RECOVERING RHODIUM VALUES OF A SPENT RHODIUM BEARING CATALYST
Hachiro Wakamatsu, Tokyo, and Masahiko Takesada and Yuichi Tsuchitani, Kanagawa-ken, Japan, assignors to Ajinomoto Co., Inc., Tokyo, Japan
No Drawing. Filed Apr. 12, 1967, Ser. No. 630,208
Claims priority, application Japan, Apr. 14, 1966, 41/23,763
Int. Cl. C22b *11/04*
U.S. Cl. 75—83                7 Claims

ABSTRACT OF THE DISCLOSURE

Rhodium is recovered as a metal or an insoluble compound from reaction mixtures in which organic compounds were prepared in the presence of a rhodium bearing soluble catalyst by contacting the mixture with aluminum, antimony, cadmium, cobalt, chromium, copper, iron, mercury, manganese, molybdenum, nickel, lead, palladium, rhodium, tin, titanium, vanadium, tungsten, or zinc in the metallic state. Acids, if present, may accelerate the separation of the rhodium.

BACKGROUND OF THE INVENTION

This invention relates to the recovery of rhodium values from mixtures of organic compounds obtained after chemical reactions in which a rhodium bearing catalyst was employed.

Rhodium carbonyl is an effective catalyst in many reactions in which carbon monoxide enters the molecule of an organic compound having a double bond, not necessarily between two carbon atoms, and in other reactions in which double bonds between carbon atoms are replaced by single bonds by hydrogenation or by isomerization. Although the amounts of rhodium required are generally very small, rhodium and its compounds are so expensive that the possibility of completely, or practically completely, recovering the catalyst may be a prerequisite for industrial application of a reaction requiring a rhodium bearing catalyst.

It is a common drawback of the known methods for recovering rhodium values from organic reaction mixtures that the recovery is incomplete particularly if the rhodium concentration of the mixture is low. The known recovery methods interfere in many instances with recovery of the organic compound formed by the catalyzed reaction. When rhodium is taken from the reaction mixture by adsorption, significant amounts of the desired product may be adsorbed together with the spent catalyst.

The object of the invention is the provision of a method which permits practically complete recovery of rhodium values from reaction mixtures of the type described, without significant loss of the desired reaction product.

SUMMARY OF THE INVENTION

According to this invention, the reaction mixture, which is normally liquid and contains the rhodium values in the form of one or more dissolved compounds, is brought into contact with a metal from the group consisting of aluminum, antimony, cadmium, cobalt, chromium, copper, iron, mercury, manganese, molybdenum, nickel, lead, palladium, rhodium, tin, titanium, vanadium, tungsten, and zinc, until a precipitate containing at least a major portion of the rhodium originally present is formed. The precipitate is separated from the liquid and may be worked up by conventional methods, if so desired.

The invention is not limited to any specific reaction in which the rhodium is employed as a catalyst. The reactions in which rhodium bearing materials are useful catalysts include reactions of carbon monoxide with unsaturated organic compounds in the presence or absence of hydrogen. Rhodium bearing catalysts are employed, and this invention is used to advantage, in reactions in which the primary reactant is an olefinic compound having an open chain and one or several non-conjugated double bonds in the chain, an alicyclic unsaturated hydrocarbon without conjugated double bonds or a terpene, a diene having conjugated double bonds, and derivatives of such unsaturated compounds.

Typical examples other than the simple olefins include cyclohexene, butadiene, vinyl acetate, the lower-alkyl acrylates, acrylonitrile, acrolein, acrylic anhydride, various N-acrylaminoolefins, nitro-olefins, vinyl chloride, styrene, acetylene, and many more. Double bonds between carbon and other atoms or between non-carbon atoms in an organic molecule also provide a reaction site in the presence of rhodium catalysts, for example, in nitrobenzene and the lower-alkyl $\beta$-formyl propionates.

The afore-mentioned compounds, when reacted in the presence of rhodium bearing catalysts, may be capable of undergoing hydroformylation (propionaldehyde from ethylene), hydrogenation (propionitrile from acrylonitrile, $\gamma$-butyrolactone from $\beta$-carbomethoxypropionaldehyde, aniline from nitrobenzene), isomerization (butene-2 from butene-1), carbonylation (diethylketone from ethylene, acetals of $\alpha$- and $\beta$-formylpropionic acid ester, lower alkyl succinates etc. from acetylene, hydroquinone from acetylene).

Even in those afore-mentioned reactions in which carbon monoxide is not an active reactant, it must be present at least in the catalyst as a rhodium carbonyl, rhodium carbonyl halide, or organic complex compound of such rhodium bearing compounds which are formed by the reaction of rhodium with carbon monoxide.

The ultimately obtained reaction mixture normally consists of the desired product, unreacted starting material, by-products, solvent, and rhodium in the form of a compound which is present either as a solute in the liquid reaction medium, a suspended finely dispersed solid, or a solid precipitate. When the rhodium values are available in a separate solid phase, they may be recovered by filtration, centrifuging, or decanting. This invention is concerned with the recovery of rhodium values from the liquid phase either in the absence of a rhodium bearing solid phase or after removal of such a solid phase.

While the precise chemical nature of the rhodium compounds present as solutes in reaction mixtures of the type described above is not known in most instances, there is evidence to indicate that they are rhodium carbonyls or coordination compounds of rhodium carbonyls with molecules of the unsaturated starting material, of the solvent, of reaction products and intermediates, or even of hydrogen. The rhodium is never present as the trivalent cationic component of an ionizable compound.

The metals which cause precipitation of the rhodium values from the liquid medium may be present singly, in mixtures, as alloys or amalgams, or as intermetallic compounds. While the metallic material should have as large a surface as possible for highest reaction rates, the shape of the metal particles is not critical. Metal sheet, granules, powder, sponge, or foil may be employed, and the metal need not be in the solid state but may be liquid. The mol ratio of the added metal to the rhodium present is preferably 5:1 or greater, but may be varied under specific conditions.

Metals which react with acids or are depolarized by the presence of acids are preferably employed in conjunction with such acids. Thus, all strong mineral acids, not only hydrochloric and sulfuric acid, may be employed to advantage in conjunction with zinc or iron, but relatively weak organic acids, such as acetic and propionic acid, significantly reduce the time required for separating the rhodium from the reaction mixture as a solid precipitate. A similar effect is often produced by an acidic organic reaction product and the separate addition of an acid to the mixture may be unnecessary. The selection of an added acid will be influenced in an obvious manner by the effects which the acid or a metal salt formed therefrom may have on the principal reaction product. The amount of acid employed is generally smaller than that required for dissolving the metal added to the reaction mixture.

The temperature at which the liquid mixture is contacted with one of the afore-mentioned metals is not critical. The preferred temperature range is between normal ambient temperature (about 15° C.) and the boiling point of the liquid reaction mixture. The rate of rhodium precipitation generally increases with temperature.

Whether the reaction is carried out in air or under an inert or reducive gas blanket, such as nitrogen or hydrogen, depends on the nature of the metal employed and of the product in the reaction mixture. A nitrogen atmosphere, for example, is preferably employed with mercury while operation in air is normally unobjectionable when zinc is used.

Shaking or stirring improves contact between the reaction mixture and the added metallic material. Passing the reaction mixture over a column packed with metal particles, and counter-current reaction of the liquid organic material with a stream of mercury, of liquid amalgams, or of another low-melting alloy has been used successfully.

Rhodium usually precipitates as minute particles of metallic rhodium on the surface of the added metal, and may be separated from the metal or worked up together with the same. The organic product formed by the catalyzed reaction is usually separated from the liquid remainder after removal of the metal and of the precipitated rhodium values, but recovery of the product prior to catalyst recovery is also possible.

When the reaction mixture is contacted with rhodium metal, separation of the precipitating agent and of the precipitate formed is not necessary, and they may jointly be returned to the process for catalyzing another batch reaction after undergoing purification for removal of organic contaminants, if necessary. Rhodium may be separated from other metals used as precipitating agents, if necessary, by conventional methods based, for instance, on the difference of specific gravity or granule size between the precipitated rhodium values and the other metal; by dissolving the metal in a strong acid such as hydrochloric acid, sulfuric acid and nitric acid which leave the precipitated rhodium undissolved; by distilling off the other metal (such as mercury and zinc); or by dissolving the other metal (such as aluminium, zinc and tin) in an aqueous solution of strong alkali, such as sodium hydroxide, and recovering rhodium from the insoluble residue. The ready conversion of the precipitated rhodium values to rhodium chloride by reaction with chlorine at high temperature, or the further conversion of said rhodium chloride to rhodium oxide hydrate may be used for this purpose.

The method of the invention permits small amounts of rhodium to be recovered from large amounts of organic reaction mixtures with yields which are very close to 100%.

DESCRIPTION OF PREFERRED EMBODIMENTS

The following examples further illustrate the method of the invention, but it will be understood that the invention is not limited thereto.

EXAMPLE 1

A stainless steel autoclave having a capacity of 300 ml. was charged with 16.4 g. cyclohexene, 19.0 mg. rhodium oxide hydrate (52.4% Rh), and 180 ml. benzene. A mixture of equal volumes of carbon monoxide and hydrogen (synthesis gas) was admitted to the autoclave until the pressure reached 200 kg./cm.$^2$ at room temperature. The autoclave was heated to 100° C. with agitation until gas absorption stopped. It was then cooled, the residual gas pressure was released, a sample of the residue was analyzed by reaction with hydroxylamine, and 190 millimols were found. The rhodium concentration in the liquid was 46 mg./l.

40 Milliliters of the reaction mixture and 3.5 ml. mercury were placed into a 200 ml. Schlenk tube, and the tube was shaken at 50–60° C. for 4 hours while its contents were kept under a nitrogen blanket. After cooling, the contents of the tube were filtered and the inner walls of the tube and the precipitate on the filter were washed with methanol. The filtrate and the washings were combined and analyzed for rhodium. Only 18γ were found. The solid material recovered by filtration contained 99% of the rhodium originally present in the treated portion of the reaction mixture. The amount of hexahydrobenzaldehyde in the combined filtrate and washings included all the hexahydrobenzaldehyde originally present, as determined by the hydroxylamine method.

The rhodium content of the liquid samples referred to above was determined by evaporation to dryness, ignition of the residue, fusion of the ignited material with potassium pyrosulfate, dissolution of the melt in water, and colorimetric rhodium determination by means of stannous chloride. Solid samples were directly subjected to ignition followed by the other steps mentioned above.

EXAMPLE 2

Another 40 ml. batch of the reaction mixture obtained in Example 1 which contained 1.84 mg. Rh, was refluxed with 40 ml. methanol, and 6 g. zinc powder in a flask on a water bath for 60 minutes. The mixture was cooled in the flask and filtered, and the walls of the flask and the recovered solids were washed with methanol. Zinc powder in the solid material was dissolved on the filter with dilute hydrochloric acid. The residue contained 1.78 mg. Rh (97% recovery).

EXAMPLE 3

The aforementioned autoclave was charged with 200 ml. methanol, 1.89 mg. rhodium oxide hydrate, 200 mM. acetylene which was dissolved in the methanol under cooling, and ultimately enough of a mixture of two volumes carbon monoxide and one volume hydrogen (synthesis gas) to raise the internal pressure to 300 kg./cm.$^2$ at ambient temperature.

The autoclave was heated to 130° C., and its contents were agitated until gas absorption was completed, whereupon the autoclave was cooled, and excess gas pressure was released. The reaction mixture discharged from the autoclave contained a black precipitate which was separated from the liquid by filtration and was found to contain 1.2 mg. Rh. A sample of the liquid was subjected to gas chromatography, and the reaction mixture was found to contain 60 mM. (millimols) hydroquinone. The liquid also was found to contain 44 mg./l. rhodium when subjected to colorimetric analysis as described above.

A 50 ml. batch of the liquid was combined in a 100 ml. Erlenmeyer flask with 1 g. zinc powder and 4 ml. 6-N hydrochloric acid which were added drop by drop. After gas formation subsided, the contents of the flask were filtered, and the precipitate was washed with methanol and 2-N hydrochloric acid. It contained 2.13 mg. rhodium (96.9% recovery). The amount of hydroquinone in the filtrate, as determined by gas chromatography, corresponded to 99% of that originally present in the batch of reaction mixture.

EXAMPLE 4

The autoclave described in Example 1 was charged with 200 ml. methanol containing 20% water, 29.2 mg. rhodium oxide hydrate, 220 mg. sodium iodide, and 100 millimols acetylene.

The reaction mixture did not contain a dark precipitate. Its rhodium content was 77.0 mg./l., and it contained 0.17 mol hydroquinone per liter.

80 ml. of the reaction mixture were heated for 60 minutes with 6 g. zinc powder to 60-70° C. in a flask equipped with a reflex condenser. The resulting mixture was worked up as in Example 1 to separate a rhodium bearing precipitate from a mother liquor which contained less than 60 micrograms rhodium. The recovered rhodium amounted to more than 99% of that originally present.

EXAMPLE 5

The procedure of Example 4 was repeated with 5.5 mg. rhodium oxide hydrate and 80 mg. sodium iodide, and at a reaction temperature of 160° C. The reaction mixture was found to contain 0.15 mol hydroquinone and 14.5 mg. insoluble rhodium per liter.

A mixture of 180 ml. of the reaction mixture and 9 ml. 6-normal hydrochloric acid was passed through an upright column of 50 g. granular zinc contained in a tube of 20 mm. diameter. The effluent contained 78γ rhodium.

The zinc granules and a fine powder of rhodium-bearing material were removed from the tube and washed with water. The washings and the floating powder were decanted from the unreacted zinc, and additional amounts of the powder were set free by shaking the zinc granules with two 100-ml. batches of 0.5 N hydrochloric acid. The combined washing were filtered, the precipitate was washed with 2-N hydrochloric acid, and analyzed. It contained 2.35 mg. rhodium (93.3% recovery).

EXAMPLE 6

The procedure of Example 1 was repeated with 34.5 g. vinyl acetate replacing the cyclohexene. The reaction mixture obtained contained 47 mg./l. rhodium.

30 ml. of the reaction mixture were further treated as in Example 1 to precipitate the rhodium, but 2 g. lead powder were kept in contact with the liquid for four hours instead of the zinc used in Example 1. The rhodium recovery was 97%.

When another 20 ml. sample of the reaction mixture was treated with 1 g. zinc powder and 22 ml. of a 1-N solution of HCl in methanol which was added drop by drop over 12 minutes, the rhodium in the manner of Example 3 amounted to 99% of that originally present.

EXAMPLE 7

The autoclave described in Example 1 was charged with 200 ml. 80% methanol, 3-80 mg. rhodium oxide hydrate to obtain the rhodium concentrations listed in the Table below, sodium iodide in an amount of 10 mols per mol of rhodium, and 200 millimol acetylene. Synthesis gas ($2CO+1H_2$) was admitted to raise the pressure to 300 kg./cm.$^2$ at room temperature, and the contents of the autoclave were heated to 130° C. with stirring until gas absorption ceased. The autoclave was then cooled and opened. When a precipitate was present, it was recovered by filtration and the rhodium content of the filtered or originally clear liquid medium was determined.

The reaction mixtures were then worked up to precipitate the rhodium therein under the conditions tabulated below. The recovery rates are listed.

TABLE

| Run No. | Liquid reaction mixture | | Metal used | Temp., °C. | Time, hrs. | Rh recovery, percent |
|---|---|---|---|---|---|---|
| | Rh, mg./l. | Batch, ml. | | | | |
| 1 | 77 | 50 | 6 g. Al | 65 | 1 | 81 |
| 2 | 77 | 50 | 6 g. Cd | 65 | 1 | 84 |
| 3 | 77 | 50 | 6 g. Cr | 65 | 1 | 55 |
| 4 | 15 | 100 | 6 g. Cu | 55 | 4 | 47 |
| 5 | 15 | 100 | 6 g. Fe | 65 | 1 | 63 |
| 6 | 41 | 30 | 1 g. Fe | 25 | 0.2 | 63 |
| 7 | 42 | 60 | 4 ml. Hg | 25 | 7 | 71 |
| 8 | 77 | 80 | 6 ml. Hg | 55 | 4 | 98 |
| 9 | 15 | 100 | 7.5 ml. Hg | 55 | 2 | 93 |
| 10 | 77 | 50 | 6 g. Mn | 65 | 1 | 93 |
| 11 | 58 | 30 | 1 g. Ni | 25 | 1 | 85 |
| 12 | 77 | 80 | 1 g. Pb | 55 | 4 | 99 |
| 13 | 77 | 80 | 6 g. Sn | 55 | 4 | 99 |
| 14 | 77 | 50 | 6 g. Ti | 65 | 1 | 59 |
| 15 | 42 | 50 | 3 g. Zn | 25 | 23 | 97 |
| 16 | 15 | 100 | 6 g. Zn | 65 | 0.5 | 98 |
| 17 | 14 | 100 | 3 g. Zn | 180 | 1 | 86 |
| 18 | 17 | 100 | 2.5 g. Zn | 70 | 1 | 99 |
| 19 | 14 | 50 | 1 g. Zn | 25 | 0.2 | 94 |
| 20 | 48 | 30 | 0.5 g. Zn | 25 | 0.2 | 92 |
| 21 | 380 | 5 | 0.4 g. Zn | 25 | 0.2 | 67 |
| 22 | 17 | 200 | 15 g. Zn/Hg | 25 | 20 | 73 |
| 23 | 20 | 60 | 3 g. Rh | 65 | 4 | 88 |
| 24 | 20 | 60 | 3 g. Rh | 60 | 6 | 83 |

NOTE.—6-N hydrochloric acid was added together with the metal in runs No. 6 (5 ml.), No. 18 (1.7 ml.), No. 19 (4 ml.). 6 ml. 2-N sulfuric acid were added to run No. 20, and 2 ml glacial acetic acid to run No. 21. A nitrogen atmosphere was employed in runs Nos. 4, 7, 8, 9, 12, 13, 15, 18 and 24. Raney nickel and a hydrogen atmosphere were used in run No. 11.

The influence of process variable on the rhodium recovery rate is apparent from the above table. Analogous results were obtained by using metallic antimony, cobalt, molybdenum, palladium, vanadium or tungsten.

What is claimed is:

1. In a method of reacting an unsaturated organic compound with a gas containing carbon monoxide in a pressure vessel at a pressure higher than atmospheric pressure in the presence of a rhodium bearing catalyst, in which a liquid reaction mixture containing rhodium values as solute is obtained, the reaction mixture being free from rhodium in the trivalent form, the improvement in recovering said rhodium values which comprises:
   (a) removing said reaction mixture from said vessel after said reacting;
   (b) contacting the removed reaction mixture with a metal selected from the group consisting of aluminum, antimony, cadmium, cobalt, chromium, copper, iron, mercury, manganese, molybdenum, nickel, lead, palladium, rhodium, tin, titanium, vanadium, tungsten, and zinc, until a solid rhodium bearing precipitate is formed from said mixture; and
   (c) separating said solid precipitate from the liquid remainder of said mixture.

2. The method of claim 1 in which said metal is selected from the group consisting of aluminum, cadmium, lead, mercury, manganese, tin and zinc.

3. The method of claim 1 in which said metal is rhodium.

4. The method of claim 1 in which said metal is selected from the group consisting of aluminum, cobalt, chromium, iron, manganese, nickel, lead, tin, and zinc, and said reaction mixture is contacted with said metal in the presence of an acid able to dissolve said metal to form hydrogen.

5. The method of claim 1, wherein said reaction mixture is free from solids prior to being contacted with said metal.

6. The method of claim 1, wherein said reaction mixture contains solid material, and said solid material is removed from the liquid prior to said contacting.

7. The method of claim 1, wherein solids, if present in said liquid reaction mixture after removal from said pressure vessel, are removed from said mixture prior to said contacting, and the mixture is contacted with said metal at ambient pressure and at a temperature substantially between 15° and 70° C.

References Cited

UNITED STATES PATENTS

| | | | |
|---|---|---|---|
| 2,829,170 | 4/1958 | Moore | 75—109X |
| 2,860,045 | 11/1958 | Nixon et al. | 75—83 |
| 2,863,761 | 12/1958 | Ashley et al. | 75—109X |
| 3,025,247 | 3/1962 | Oleck | 252—472X |
| 3,176,038 | 3/1965 | Zachry et al. | 252—472X |
| 3,303,020 | 2/1967 | Clement et al. | 75—83 |
| 3,318,913 | 5/1967 | Falbe et al. | 252—472X |

L. DEWAYNE RUTLEDGE, Primary Examiner

U.S. Cl. X.R.

75—109